Oct. 23, 1928.  1,688,319
A. ALLIS
COOKING MOLD
Filed June 27, 1927
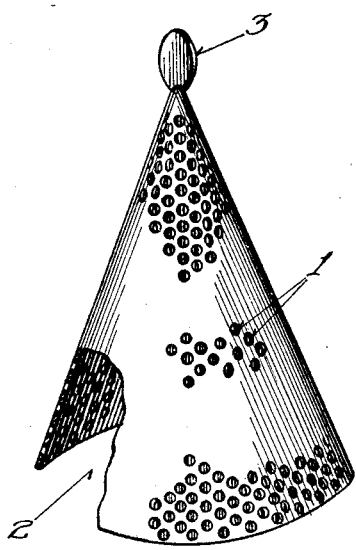
Fig. 1
Fig. 2
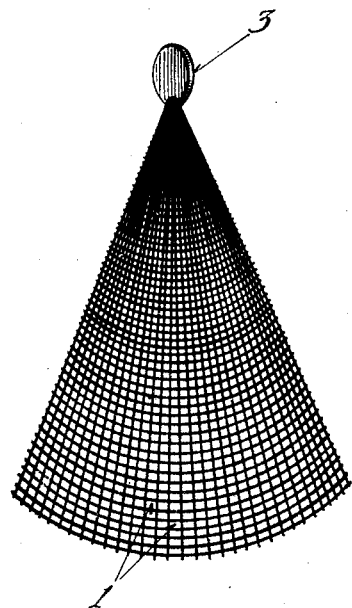
Inventor:
Amber Allis,
By Edwin B. H. Power, Jr.
Atty.

Patented Oct. 23, 1928.

1,688,319

UNITED STATES PATENT OFFICE.

AMBER ALLIS, OF MILWAUKEE, WISCONSIN.

COOKING MOLD.

Application filed June 27, 1927. Serial No. 201,796.

This invention relates to a cooking mold.

The object is to provide a simple, inexpensive and efficient cooking mold to mold food in the preparation thereof into uniform and pleasing shape.

Another object is to provide a mold for use in the preparation of foods, such as croquettes.

Another object is to provide a cooking mold that may be readily removed from the food after the same has been shaped in definite form.

According to this invention, the cooking mold comprises a mesh fabric or foraminous body having an open base and a handle above the base.

The accompanying drawings illustrate cooking molds made in accordance with the invention and the views therein are as follows:

Fig. 1 is a perspective view of a cooking mold.

Fig. 2 is a perspective view of another cooking mold.

The cooking mold shown in Fig. 1 is of conical shaped sheet metal and is provided with perforations 1 throughout its walls to allow the escape of gases from the food during the cooking or frying and to allow the food to brown in frying.

The mold has an open base 2 and a handle 3 of any desired shape and form arranged above the base.

Fig. 2 shows a mold of wire fabric.

In this form, the handle may be attached to the fabric at the apex as shown or arranged in any other suitable manner.

The mold is preferably used for the making of croquettes which are ordinarily extremely difficult to maintain in molded shape while cooking due to distortion from internal gases.

Such distortion of the croquettes is prevented by keeping the mold on the same while cooking and providing a multiplicity of openings in the mold for the escape of gases.

The openings also allow the grease in which the croquette is cooked to contact therewith and give it a crisp evenly browned surface.

The mold is held with the handle down when filling with food and then put in the frying pan with the handle up and the food inside.

After the croquette has been cooked properly, the mold may be easily removed therefrom by the handle.

The mold may be stamped or spun to provide a seamless structure if desired.

Instead of having a conical shape as shown, the mold may be shaped like a hemisphere or pyramid or even have a rectilinear base and inclined sides.

Of course, the mold which is herein set forth may be modified in various ways without departing from the invention as hereafter defined in the claims.

The invention is hereby claimed as follows:

1. A cooking mold comprising a conical foraminous body having an open base, and a handle arranged above said base.

2. A cooking mold comprising a conical foraminous body having an open base, and a handle arranged at the apex of said body.

3. A cooking mold comprising a conical meshed body having an open circular base, and a handle arranged above said base.

4. A cooking mold comprising a conical meshed body having an open circular base, and a handle arranged at the apex of said body.

5. A cooking mold comprising a conical foraminous body having an open circular base of less diameter than the height of said body, and a handle arranged above said base.

6. A cooking mold comprising a conical foraminous body having an open circular base of less diameter than the height of said body, and a handle arranged at the apex of said body.

In witness whereof, I have hereunto subscribed my name.

AMBER ALLIS.